United States Patent

[11] 3,600,955

| [72] | Inventor | Vincent Ernest Bischoff<br>River Grove, Ill. |
|---|---|---|
| [21] | Appl. No. | 867,054 |
| [22] | Filed | Oct. 16, 1969 |
| [45] | Patented | Aug. 24, 1971 |
| [73] | Assignee | A. B. Dick Company<br>Chicago, Ill. |

[54] INK DROP VELOCITY INDICATOR
10 Claims, 3 Drawing Figs.

[52] U.S. Cl. ................................................ 73/518,
73/194 F, 346/75, 324/178
[51] Int. Cl. ....................................................... G01d 15/18
[50] Field of Search ............................................. 73/194,
518; 346/75

[56] References Cited
UNITED STATES PATENTS

| 2,699,677 | 1/1955 | McCallum et al. | 73/194 |
| 3,013,207 | 12/1961 | Schwalbe et al. | 324/68 |
| 3,465,351 | 9/1969 | Keur et al. | 346/75 |

*Primary Examiner*—Charles A. Ruehl
*Attorney*—Lindenberg and Freilich

ABSTRACT: For use in an ink jet printing system a drop velocity measuring circuit comprising an astable multivibrator and a flip-flop. The multivibrator and the flip-flop are interconnected with each other and with the charging tunnel and the drop detector of the printing system so that for each pulse of the multivibrator, the flip-flop produces an output pulse whose width represents the transit time required for drops to travel from the charging tunnel to the drop detector. The output pulses of the flip-flop are supplied to a pulse width measuring circuit whose output represents the monitored or measured drop velocity. The pulse width measuring circuit includes a gated ramp generator, followed by a clipper and current amplifier which is used to drive a recorder or meter, the reading of which represents drop velocity. The meter scale is preferably calibrated to indicate the specified limits between which the drop velocity must lie for the proper operation of the ink jet printing system.

INK DROP VELOCITY INDICATOR

BACKGROUND OF THE INVENTION

1. Field of the Invention

This invention relates generally to improvements in an ink jet printing system and, more particularly, to means for monitoring the velocity of charged drops in such a system in their travel toward a printing medium.

2. Description of the Prior Art

Typically, in an ink jet printing system, several of which are presently in existence a jet of ink which passes through a vibrating nozzle breaks up into drops. At the point of drop formation the drops are charged by means of a charging tunnel. The drops are made to assume charges in accordance with video signals. The charged drops pass through an electric field, as a result of which the drops are deflected by amounts determined by the charge thereon, so as to form a desired pattern or writing on a printing or writing medium, upon which the deflected drops fall.

As pointed out in U.S. Pat. application Ser. No. 712,808 filed Mar. 13, 1968, now U.S. Pat. No. 3,465,351 and assigned to the assignee of the present application, improvements in such an ink jet printing system are described and claimed. These improvements comprise means for controlling the phase of vibration of the nozzle relative to the video charging signals to insure proper charging of the ink drops by the video signals. Proper ink drop charging is necessary to insure the uniformity and fidelity of the printing or writing. These improved means include a drop detector which the charged drops strike. The detector provides a signal of a selected frequency, peculiar to the pattern of a stream of properly charged and gathered drops. It is the signal of the drop detector which is used in controlling the phase of the nozzle vibration relative to the video charging signals. Thus, the improvement described in the above-referred to patent application greatly contribute to the uniformity and fidelity of the printing realizable with the ink jet printing system.

It is appreciated by those familiar with the art that for an ink jet printing system to function properly, in addition to controlling proper drop charging the velocity with which the charged drops travel toward the printing medium must be set to be within specific limits. The drop velocity is dependent on ink pressure at the nozzle orifice. Although the ink pressure at the nozzle orifice is to a significant degree related to gauge pressure, it is also related to other physical conditions or factors, such as pressure drop in an ink filter, and friction in various hoses, through which the ink passes. Other factors include friction inside the nozzle and fluid friction at the orifice itself. Many of these factors are not easily measurable or adjustable.

In the prior art, drop velocity is determined by observing the spacing between drops in the drop stream with a microscope and a strobe light. The pressure of the ink from an appropriate ink source is then adjusted until the drop velocity falls within specified limits. Such a technique, though useful to some degrees, is very inconvenient and cumbersome. Thus, a need exists for improved means for monitoring or measuring the velocity of drops in an ink jet printing system. Since the monitoring of drop velocity has to be performed quite often, such as during the servicing of the system, it is desirable that the means be relatively simple so that they can be packaged as a small serviceman's tool or as an additional built-in option of the system. In either case it is desirable that the means be relatively inexpensive in order to not affect, to any significant degree, the overall system cost or its servicing.

OBJECTS AND SUMMARY OF THE INVENTION

It is a primary object of the present invention to provide means to monitor the velocity of charged drops in an ink jet printing system.

Another object of the present invention is to provide a reliable circuit which is operable with devices forming part of an existing ink jet printing system for monitoring the velocity of charged drops in the system.

A further object of the present invention is to provide a relatively inexpensive, reliable circuit which does not require the use of a microscope or strobe light to monitor the velocity of charged drops in an ink jet printing system.

These and other objects of the invention are achieved by providing a relatively simple circuit, hereafter also referred to as the drop velocity measuring circuit, which includes an astable multivibrator and a flip-flop. The multivibrator and the flip-flop are interconnected with each other and with the charging tunnel and the drop detector so that for each pulse of the multivibrator, the flip-flop produces an output pulse whose width represents the transit time required for drops to travel from the charging tunnel to the drop detector, which in any system is a fixed distance. The transit time is inversely proportional to drop velocity.

The output pulses of the flip-flop are supplied to a pulse width measuring circuit whose output represents the monitored or measured drop velocity. The pulse width measuring circuit includes a gated ramp generator, followed by a clipper and current amplifier which is used to drive a recorder or meter, the reading of which represents drop velocity. The meter scale is preferably calibrated to indicate the specified limits between which the drop velocity must lie for the proper operation of the ink jet printing system.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
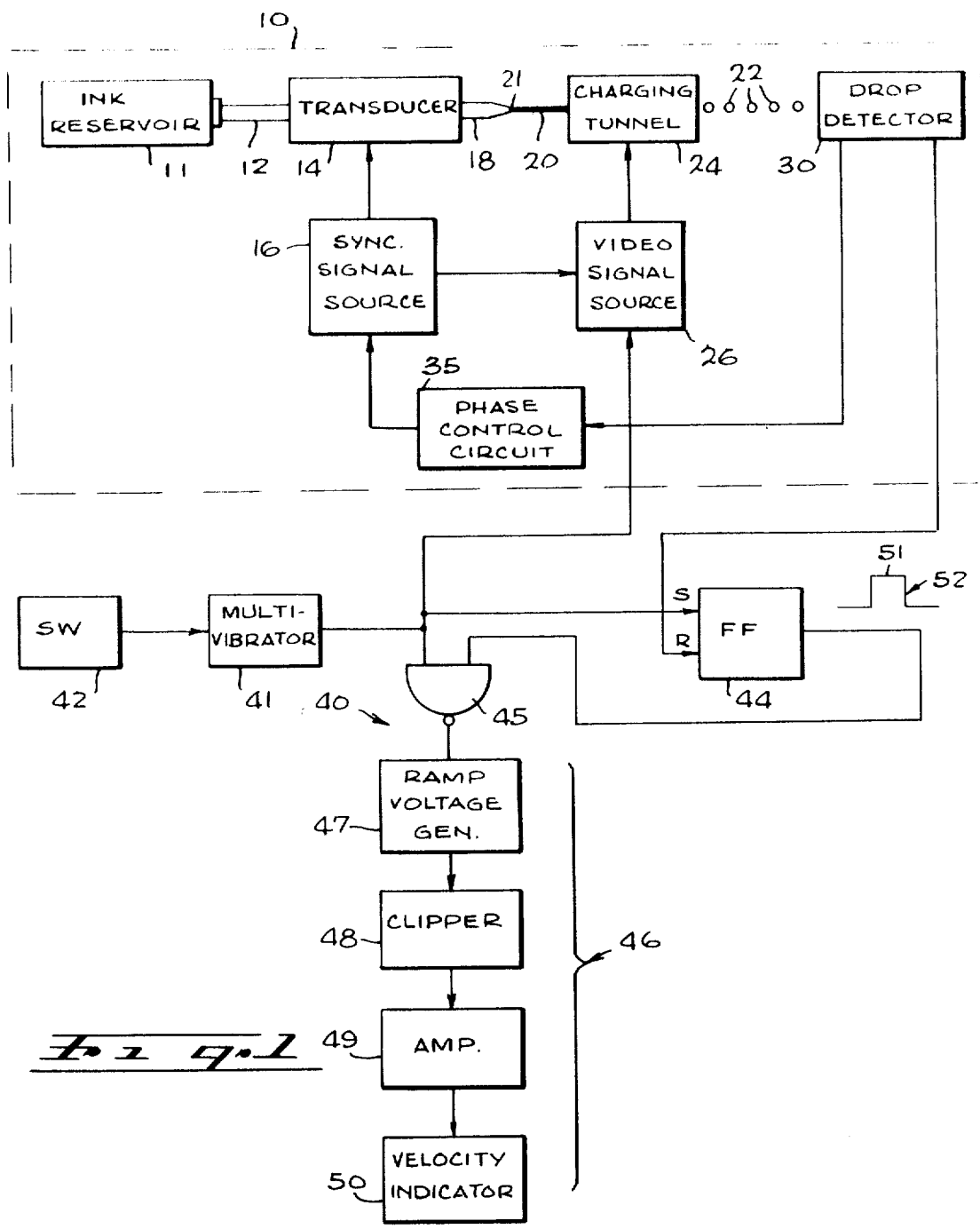
FIG. 1 is a block diagram of the drop velocity measuring circuit of the present invention.

Reference is now made to FIG. 1 wherein the various elements enclosed by dashed line 10 represent parts of an ink jet printing system, such as the one described in the aforementioned U.S. Pat. No. 3,465,351. These parts are shown and will be described briefly in order to explain the manner in which the novel drop velocity measuring circuit of the present invention is used together with such parts, which do not form part of this invention.

Briefly, the ink jet printing system includes an ink reservoir 11 which provides ink under pressure to a flexible tubing 12. An electromechanical transducer 14 is usually placed adjacent to or around the tubing. The transducer is driven in response to signals from a source 16. The transducer serves to vibrate and/or compress the tubing 12 in the region of nozzle 18. This results in an ink jet 20 being emitted from the nozzle orifice 21. A short distance from nozzle 18 the ink jet breaks up into drops 22 which are formed at a rate determined by the frequency of the vibration.

In the region where the ink jet 20 breaks down into the drops 22, a charging tunnel 24 is positioned. Generally, the tunnel comprises a conductive cylinder or a narrow channel to which video signals from a video signal source 26 are applied. The video signals establish a field within the charging tunnel 24 so that an ink drop which is formed therein assumes a charge, determined by the amplitude of the video signal at the time the drop separates from the ink jet 20. Downstream of the charging tunnel are located a pair of electrodes (not shown) which are connected to a field bias source (not shown). The charged drops pass between the electrodes, and are deflected to a printing medium (not shown) as a function of their charges.

A system, such as the one described in the aforementioned application, includes a drop detector 30 which senses the drops directed thereto and provides a control signal only when the drops strike it at a desired rate of frequency. The control signal from the detector is supplied to a phase control circuit 35 which controls the source 16 in order to control the phase of the vibrating signals supplied thereby in relation to the video signals. Such an arrangement insures a proper formation of drops needed for proper drop charging.

In accordance with the teachings of the present invention, a drop velocity measuring circuit is provided which coacts with the video signal source 26 and the drop detector 30 to provide a measure or an indication of the velocity of the drops 22 in their downstream travel. As shown in FIG. 1, the novel circuit, generally designated by numeral 40, includes an astable multivibrator 41, which is activated by a manually operable switch 42, a flip-flop 44, a buffering gate 45 and a pulse width measuring circuit 46. In one embodiment the latter consists of a ramp voltage generator 47, a clipper 48, an amplifier 49 and a velocity indicator 50, which may assume the form of an ammeter.

Figure 2:
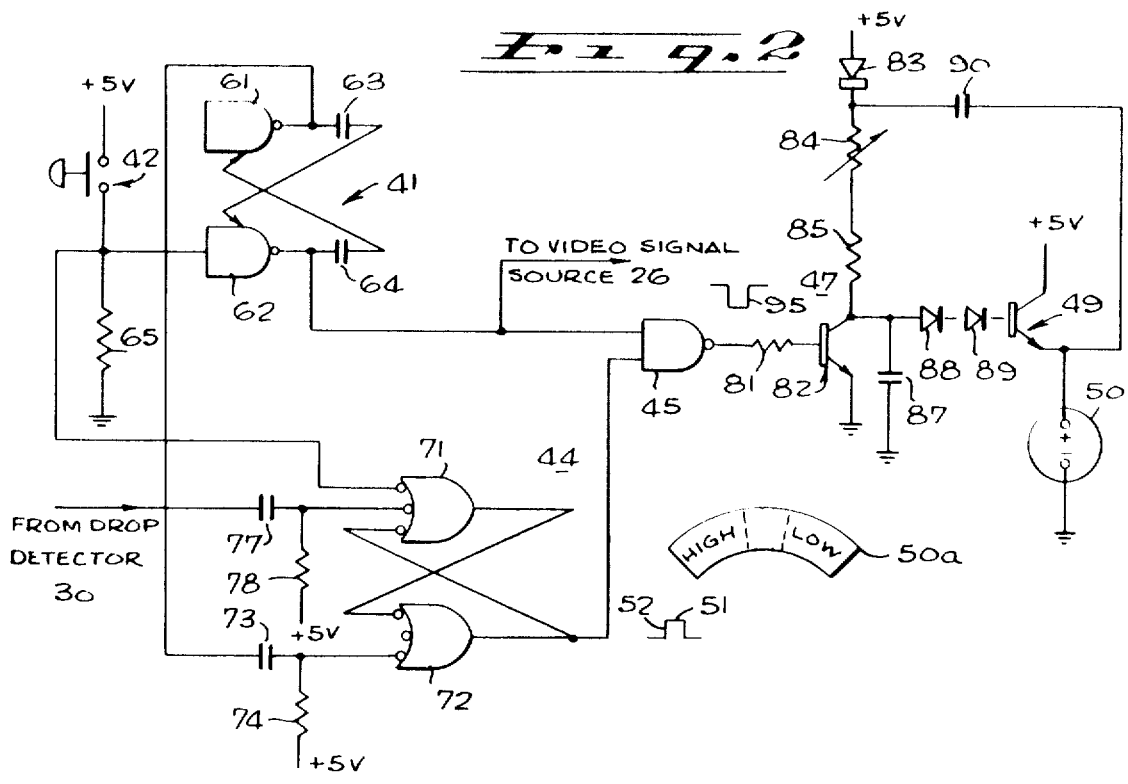
FIG. 2 is a schematic diagram of one embodiment of the invention.

A specific embodiment which was actually reduced to practice is diagrammed in block and schematic form in FIG. 2, wherein the types and values of various circuits and components are also included, for explanatory purposes only, rather than as a limitation of the invention.

The multivibrator 41 is enabled or activated when the manually operable switch 42 is closed. The multivibrator which is connected so as to gate the video signal source 26 and to the set (S) input of flip-flop 44, provides a train of pulses. The rate of pulses is controlled by the multivibrator's time constant, as is well-known. During the duration of each pulse of the one shot the video signal source 26 is turned on to charge drops, formed in, and passing through, the charging tunnel 24. Between pulses of the multivibrator the source 26 is turned off. In one embodiment the trailing edge of each pulse sets the flip-flop 44 so that its output is at a positive state, as represented by line 51 of a pulse 52.

The drop detector 30 is connected to the reset (R) input of FF44. When a selected number of drops strike the detector 30 it provides a signal which resets the flip-flop. In one embodiment this signal is represented by a transition from a positive to a negative level. Consequently the width of the positive output pulse, such as pulse 52, of the FF44 represents the time required for charged drops to travel from the tunnel 24 to the detector 30, which is at a fixed distance from the tunnel. Alternately stated, the width of pulse 52 represents drop transit time. Since the distance traveled by the drops is fixed, the pulse width is inversely proportional to the drop velocity. The flip-flop produces output pulses at a rate determined by the rate of pulses of the multivibrator 41.

The pulses from the multivibrator 41 and FF44 are supplied to gate 45 whose output, representing pulses of widths corresponding to the widths of the output pulses of the flip-flop, is supplied to the ramp voltage generator 47 of the drop velocity measuring circuit 46. The voltage, provided by generator 46 at the end of each output pulse of gate 45, depends on the pulse width. This voltage, after passing through clipper 48, is amplified by amplifier 49, whose output activates the velocity indicator 50. When the latter is an ammeter, such as the one shown in FIG. 2, the clipper 48 is incorporated to offset the range of the meter so that its scale covers only the range of velocities that are of interest.

In FIG. 2 the meter scale, designated 50a, is shown comprising sections labeled HIGH and LOW with a shaded section, which represents the specified limits of the desired drop velocity.

In the same Figure, a particular embodiment of the invention, which was actually reduced to practice, is shown. The multivibrator 41 is shown comprising a pair of NAND gates 61 and 62 interconnected with a pair of capacitors 63 and 64. Manually operable switch 42 is represented by a push-type switch which connects the input of gate 62 to a positive potential such as +5 volts and to ground through a resistor 65. One output of the multivibrator 41 is connected to the video signal source 26 in such a way as to gate the video signal to the charging tunnel 24.

The flip-flop 44 is shown comprising a pair of interconnected NOR gates 71 and 72. One input of gate 72 is connected through a capacitor 73 to the output of gate 61, which represents another output of the multivibrator, and to +5 volts through a resistor 74. Gate 72 is activated to set the flip-flop when the multivibrator produces a pulse. Likewise, one input of gate 71 is connected to the drop detector 30 through a capacitor 77, the same input also being connected to +5 volts through a resistor 78. Thus, FF44 is reset when the output signal of the drop detector enables gate 71. As shown, gate 71 is also connected to switch 42 so that the FF44 is held in the reset condition when the switch 42 is not depressed, so that no current flows in the meter 50.

The outputs of gates 62 and 72 represent outputs of the multivibrator 41 and FF44, respectively. These outputs are supplied as inputs to NAND gate 45, whose output is supplied through a resistor 81 to the base of an NPN transistor 82, which forms part of the ramp voltage generator 47. The collector of transistor 82 is connected to the +5 volts through serially connected diode 83, a variable resistor 84 and a fixed resistor 85, while the transistor's emitter is connected to ground.

The collector of the transistor 82 which represents the output line of generator 47 and which is connected to capacitor 87 is supplied to the base of a transistor 49 which serves as amplifier 49, through the clipper 48, which in FIG. 2 is represented by diodes 88 and 89. As shown the collector of transistor 49 is tied to +5 volts and the emitter is coupled to ground through an ammeter 50 which serves as the velocity indicator 50, by displaying the emitter current of transistor 49. For improved linearity of operation, the emitter of transistor 49 is connected to the junction point of diode 83 and resistor 84 through a capacitor 90.

From the foregoing description it should be appreciated that the duration of each positive output pulse, such as pulse 52 (FIG. 1) of the FF44 is a function of drop transit time and therefore is inversely proportional to drop velocity. Since the duration of each pulse from gate 45 is related to the flip-flop's pulse duration, the duration of each pulse of the gate is likewise related to drop velocity. Each output pulse of gate 45, represented by the negative pulse 95, switches transistor 82 to a nonconductive state, thereby controlling the potential which is built up across the capacitor 87. This potential controls the potential at the base of transistor 49. Thus, the emitter current of the latter is affected to indicate the drop velocity.

Figure 3:
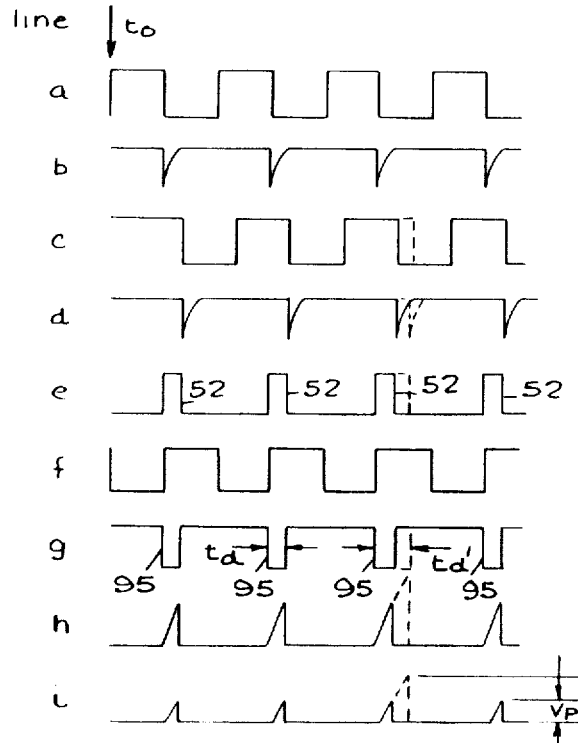
FIG. 3 is a multiline diagram of waveforms, useful in summarizing the embodiment, shown in FIG. 2.

The operation of the circuits shown in FIG. 2 may further be summarized in conjunction with FIG. 3 which is a multiline diagram of the waveforms at various input and outputs of the circuits. Line $a$ represents the waveform at the output of gate 61 of the multivibrator 41 when the switch 42 is closed at $t_o$. Line $b$ diagrams negative pulses which are applied to gate 72 by capacitor 73, setting FF44 whose output pulses are diagrammed in line $c$. Line $c$ represents the outputs of the drop detector 30. Drop detections are represented by the positive to negative transitions. In line $d$ are diagrammed negative pulses which are applied to the input of gate 71 by capacitor 77 as a result of the drop detections. These pulses reset FF44.

Line $f$ diagrams the output of gate 62 of the multivibrator 41, which are supplied to both gate 45 and the video signal source 26, while line $g$ diagrams the output pulses 95 provided by gate 45. During the duration of each pulse 95 the transistor is switched to a nonconductive state, thereby enabling a potential to be built up across capacitor 87. Line $h$ diagrams the ramp potential or voltage which is developed across the capacitor, and line $i$ diagrams the voltages sensed by meter 50.

The FIG. 3 $T_d$ represents a selected transit time while $T_d'$ represents a longer drop transit time. $V_p$ represents the peak voltage sensed by meter 50 wherein the drop transit time is $T_d$, while $V_p'$ represents the peak voltage sensed when the longer drop transit time $T_d'$ is experienced.

It should be appreciated that the embodiment of the invention shown in FIG. 2, consists of relatively simply and inexpensive circuits and components. Also, these circuits and components can be easily packaged to form a small unit. As herebefore indicated, such a unit may serve as a serviceman's tool for measuring the drop velocity. On the basis of the measured velocity the ink pressure from reservoir 11 may be adjusted to insure that the drop velocity is within the specified limits. The novel circuit as a unit may be incorporated in the system as a built-in option which due to its simplicity will not increase the system's cost appreciably, yet provide it with a drop velocity measuring capability which prior art systems do not have.

Although particular embodiments of the invention have been described and illustrated herein, it is recognized that modifications and variations may readily occur to those skilled in the art and consequently it is intended that the claims be interpreted to cover such modifications and equivalents.

What I claim is:

1. For use in an ink jet printing system of the type including means for forming a stream of drops, a video signal generator coupled to charging means through which said drops pass for charging said drops and a drop detector which provides a signal as a function of the detection of drops thereby, a circuit for measuring the velocity of the charged drops in their travel from said charging means to said drop detector, comprising:
   first means coupled to said video signal generator and said drop detector for providing output pulses whose durations are related to the transit times of drops in traveling from said charging means to said drop detector; and
   second means responsive to the output pulses of said first means for indicating the velocities of said drops in their travel from said charging means to said drop detector.

2. The arrangement as recited in claim 1 wherein said first means comprises an astable multivibrator for providing a sequence of pulses, with said multivibrator being coupled to said video signal generator for activating the latter during the duration of each pulse in said sequence to charge the drops passing through said charging means, said first means further including a bistable element coupled to said astable multivibrator and to said drop detector, said bistable element being driven to a set state by each pulse from said multivibrator to provide an output of a selected level, said bistable element being driven to its reset state by the output of said drop detector, whereby the duration during which the output of said bistable element is at said selected level is a function of the time required for drops, charged by said charging means in response to the activated video signal generator, to travel from said charging means to said drop detector.

3. The arrangement as recited in claim 1 wherein said second means comprise a ramp voltage generator for providing a voltage proportional to the duration of each output pulse of said first means, and display means for providing an indication related to the voltages provided by said ramp voltage generator in response to a sequence of output pulses from said first means.

4. The arrangement as recited in claim 3 wherein said first means comprises an astable multivibrator for providing a sequence of pulses, with said multivibrator being coupled to said video signal generator for activating the latter during the duration of each pulse in said sequence to charge the drops passing through said charging means, said first means further including a bistable element coupled to said astable multivibrator and to said drop detector, said bistable element being driven to a set state by each pulse from said multivibrator to provide an output of a selected level, said bistable element being driven to its reset state by the output of said drop detector, whereby the duration during which the output of said bistable element is at said selected level is a function of the time required for drops, charged by said charging means in response to the activated video signal generator, to travel from said charging means to said drop detector.

5. The arrangement as recited in claim 4 wherein said bistable element of said first means is a flip-flop.

6. The arrangement as recited in claim 5 wherein said display means comprises a meter having a scale defining a section which represents a drop velocity within selected limits.

7. A circuit for providing an indication of the velocity of drops produced in an ink jet printing system of the type including a source of ink, means for forming a stream of drops, video signal generating means for charging said drops which pass through said generating means, and a drop detector which detects charged drops impinging thereon, the circuit comprising:
   an astable multivibrator;
   a bistable element;
   coupling means for coupling said astable multivibrator and said bistable element to said video signal generating means and to said drop detector; to provide a sequence of pulses whose durations are a function of the velocity of drops moving from said video signal generating means to said drop detector; and
   output means responsive to said pulses and including ramp voltage generating means for providing indications of the drops' velocity.

8. The arrangement as recited in claim 7 wherein a leading edge of each pulse of said astable multivibrator activates said video signal generating means to charge the drops passing therethrough, the leading edge of said each pulse driving said bistable element to a first state, and said drop detector, upon sensing drops impinging thereon, drives said bistable element to a second state, opposite said first state, whereby the duration in which said bistable element is in said first state is a function of the drops' velocity.

9. The arrangement as recited in claim 8 wherein said ramp voltage generating means provides a potential which is a function of the duration in which said bistable element is in said first state, and said output means include chargeable means which charge up to the potential produced by said ramp voltage generating means.

10. The arrangement as recited in claim 9 wherein said output means include a transistor whose state of conduction is a function of the potential across said chargeable means, and indicating means coupled to said transistor for providing an indication of the current flow through said transistor.